(12) United States Patent
Bing

(10) Patent No.: US 8,400,918 B2
(45) Date of Patent: Mar. 19, 2013

(54) VIDEO TRAFFIC SMOOTHING

(75) Inventor: Benny Bing, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 706 days.

(21) Appl. No.: 12/581,014

(22) Filed: Oct. 16, 2009

(65) Prior Publication Data

US 2011/0032428 A1    Feb. 10, 2011

Related U.S. Application Data

(60) Provisional application No. 61/231,836, filed on Aug. 6, 2009.

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)

(52) U.S. Cl. ............ 370/230.1; 370/229; 370/230; 370/231; 370/232; 370/233; 370/234

(58) Field of Classification Search .. 375/240.01–240.29, 371; 370/229–235.1, 370/395.21
See application file for complete search history.

(56) References Cited

U.S. PATENT DOCUMENTS

| | | | |
|---|---|---|---|
| 5,537,446 A * | 7/1996 | Lakshman et al. | 375/371 |
| 6,192,032 B1 * | 2/2001 | Izquierdo | 370/230 |
| 6,803,964 B1 | 10/2004 | Post et al. | |
| 7,333,515 B1 | 2/2008 | Ramakrishnan et al. | |
| 8,254,445 B2 | 8/2012 | Bing | |
| 8,254,449 B2 | 8/2012 | Bing et al. | |
| 2007/0036227 A1 | 2/2007 | Ishtiaq et al. | |
| 2007/0206639 A1 | 9/2007 | Zhao et al. | |
| 2008/0137735 A1 | 6/2008 | Kamariotis et al. | |
| 2008/0263616 A1 | 10/2008 | Sallinen et al. | |
| 2008/0298467 A1 | 12/2008 | Sallinen et al. | |
| 2009/0041114 A1 | 2/2009 | Clark | |
| 2009/0097555 A1 | 4/2009 | Baillavoine et al. | |
| 2010/0027663 A1 | 2/2010 | Dai et al. | |
| 2010/0054333 A1 | 3/2010 | Bing | |
| 2011/0032429 A1 | 2/2011 | Bing | |

FOREIGN PATENT DOCUMENTS

GB    2 447 431 A    9/2008

OTHER PUBLICATIONS

Supporting Stored Video: Reducing Rate Variability and End-to-End Resource Requirements Through Optima Smoothing, Author(s) James D. Salehi et al., 1998 IEEE.*
"Online VBR Video Traffic Smoothing" Author(s) Guohong Cao et al. 1999 IEEE.*
U.S. Office Action dated Mar. 6, 2012 cited in U.S. Appl. No. 12/581,020, 13 pgs.
J Rexford, et al., *"Online Smoothing of Live, Variable-Bit-Rate Video,"* Proceedings of the Workshop on Network and Operating System Support for Digital Audio and Video, pp. 249-257, May 1997.

(Continued)

*Primary Examiner* — Sath V Perungavoor
*Assistant Examiner* — Nathnael Aynalem
(74) *Attorney, Agent, or Firm* — Merchant & Gould

(57) ABSTRACT

Video traffic smoothing may be provided. A video stream may be divided into segments for transmission. For each segment, a desired transmission rate and a range of possible transmission rates may be established. The desired transmission rate may be evaluated to determine whether the rate may result in an overflow and/or a starvation of a memory buffer associated with a receiver. The transmission rate and/or the segment size may be varied to avoid these scenarios.

21 Claims, 7 Drawing Sheets

OTHER PUBLICATIONS

J. Salehi, et al., "*Supporting Stored Video: Reducing Rate Variability and End-to-End Resource Requirements through Optimal Smoothing*," IEEE Transactions on Networking, vol. 6, No. 4, Aug. 1998, pp. 397-410.

O. Hadar and S. Greenberg, "*Statistical Multiplexing and Admission Control Policy for Smoothed Video Streams using e-PCRTT Algorithm*", Proceedings of the International Conference on Information Technology: Coding and Computing, pp. 272-277, Mar. 2000.

H.C. Chao, C.L. Hung, Y.C. Chang, and J. L. Chen, "*Efficient Changes and Variability Bandwidth Allocation for VBR Media Streams*", International Conference on Distributed Computing Systems Workshop, pp. 289-294, Apr. 2001.

U.S. Office Action dated Dec. 21, 2011 cited in U.S. Appl. No. 12/550,698, 13 pgs.

* cited by examiner

VIDEO TRAFFIC SMOOTHING

RELATED APPLICATIONS

Under provisions of 35 U.S.C. §119(e), Applicants claim the benefit of U.S. Provisional Application No. 61/231,836, filed Aug. 6, 2009, which is hereby incorporated by reference.

Related U.S. patent application Ser. No. 12/550,698, filed on Aug. 31, 2009, entitled "Video Traffic Bandwidth Prediction," and assigned to the assignee of the present application, is hereby incorporated by reference.

Related U.S. patent application Ser. No. 12/581,020, filed on even date herewith, entitled "Video Transmission Using Video Quality Metrics," and assigned to the assignee of the present application, is hereby incorporated by reference.

BACKGROUND

In video distribution systems, encoded video streams may use variable bit-rates to provide a constant quality in the video performance. This may sometimes result in large variances in the amount of bandwidth needed to transmit the video stream. For example, transmission of a constant quality, variable bit rate (VBR) HD video stream encoded according to the H.264 compression standard may vary by over 2000 Kbps between peak and trough transmission rates. This may result in an inefficient use of available bandwidth at the trough and packet loss and/or buffer overflows by a receiving device at the peak. Conventional systems may modify VBR transmit video streams into constant bit rate streams by lowering the size of large frames, such as scene transition frames, but this compromises the video quality of such frames.

SUMMARY

Consistent with embodiments of the present invention, systems and methods are disclosed for providing video traffic smoothing. A video stream may be divided into segments for transmission. For each segment, a desired transmission rate and a range of possible transmission rates may be established. The desired transmission rate may be evaluated to determine whether the rate may result in an overflow and/or a starvation of a memory buffer associated with a receiver. The transmission rate and/or the segment size may be varied to avoid these scenarios.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Figure 1:
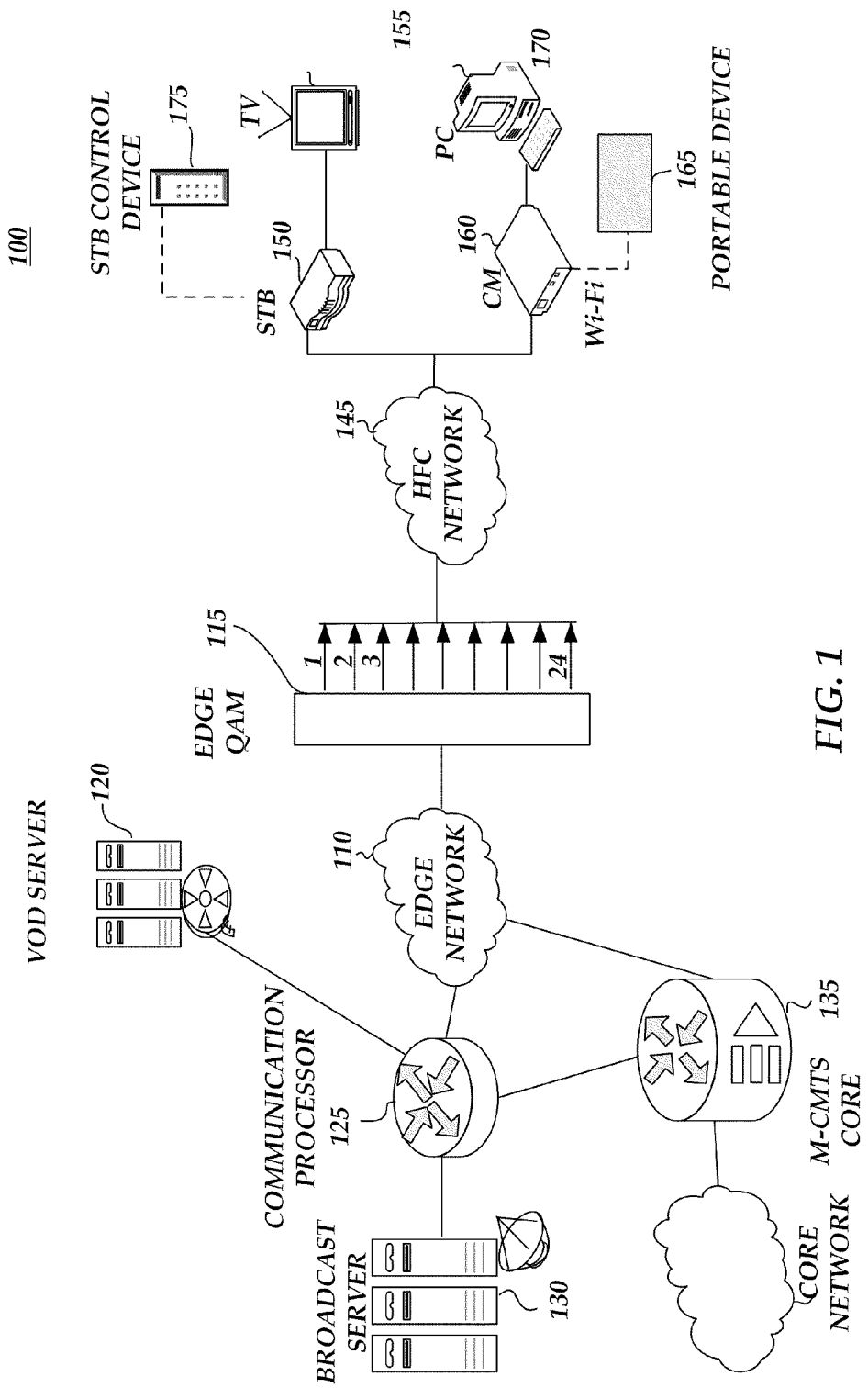
FIG. 1 is a block diagram of a content delivery system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. This content may be encoded using a variety of compression schemes in order to reduce the amount of bandwidth required to transmit the content. Network equipment may provision bandwidth for this content to ensure a smooth flow of data and to minimize interruptions or distortions in the content as provided to a user. The network, however, may be responsible for delivering content to a large number of users, each of which may need to have bandwidth allocated to their chosen programming. For example, two neighbors may each request access to different pay-per-view (PPV) and/or video-on-demand (VoD) content. The content provider may have to balance the bandwidth available to the neighbors in order to provide a quality viewing experience. In conventional systems, this may comprise allocating a static amount of bandwidth to each user for the duration of their requested content. For example, the two different video streams may vary over time in the amount of bandwidth needed to transmit each frame. Consistent with embodiments of the invention, a video traffic smoothing algorithm may be applied to the video stream prior to transmission. The algorithm may establish an upper and/or a lower bound for a rate of data to be transmitted to a receiver, such as a user's set-top terminal. Thus, the duration of the video stream may be transmitted within a predefined range of rates that may allow the content provider to make efficient use of their bandwidth resources.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communication processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100. Consistent with embodiments of the invention, edge network 110 may be operative to allocate and schedule upstream and/or downstream bandwidth for two-way data transmission between video processor 125 and user devices connected to HFC network 145, such as STB 150 and cable modem 160.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Edge network 110 and HFC network 145 may comprise non-limiting, example communication networks for the transmission of video streams from a content provider to a user. Other examples may comprise DOCSIS—networks, digital subscriber line (DSL) networks, wireless networks, and/or any other communication medium.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, provide a memory buffer for storing incoming and/or outgoing data, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a broadband Internet-enabled TV, smartphones, a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for predicting video traffic bandwidth requirements. The system may comprise a memory storage and a processing unit coupled to the memory storage. The processing unit may be operative to process video data encoded in a compression scheme, such as MPEG-2 and/or MPEG-4. The processing unit may predict the size of subsequent data frames of a content stream and may allocate bandwidth in edge network 110 and/or HFC network 145 accordingly. The processing unit may also be operative to share its predicted sizes and/or bandwidth requirements with components of edge network 110 and/or HFC network 145 operative to control and/or allocate bandwidth resources.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
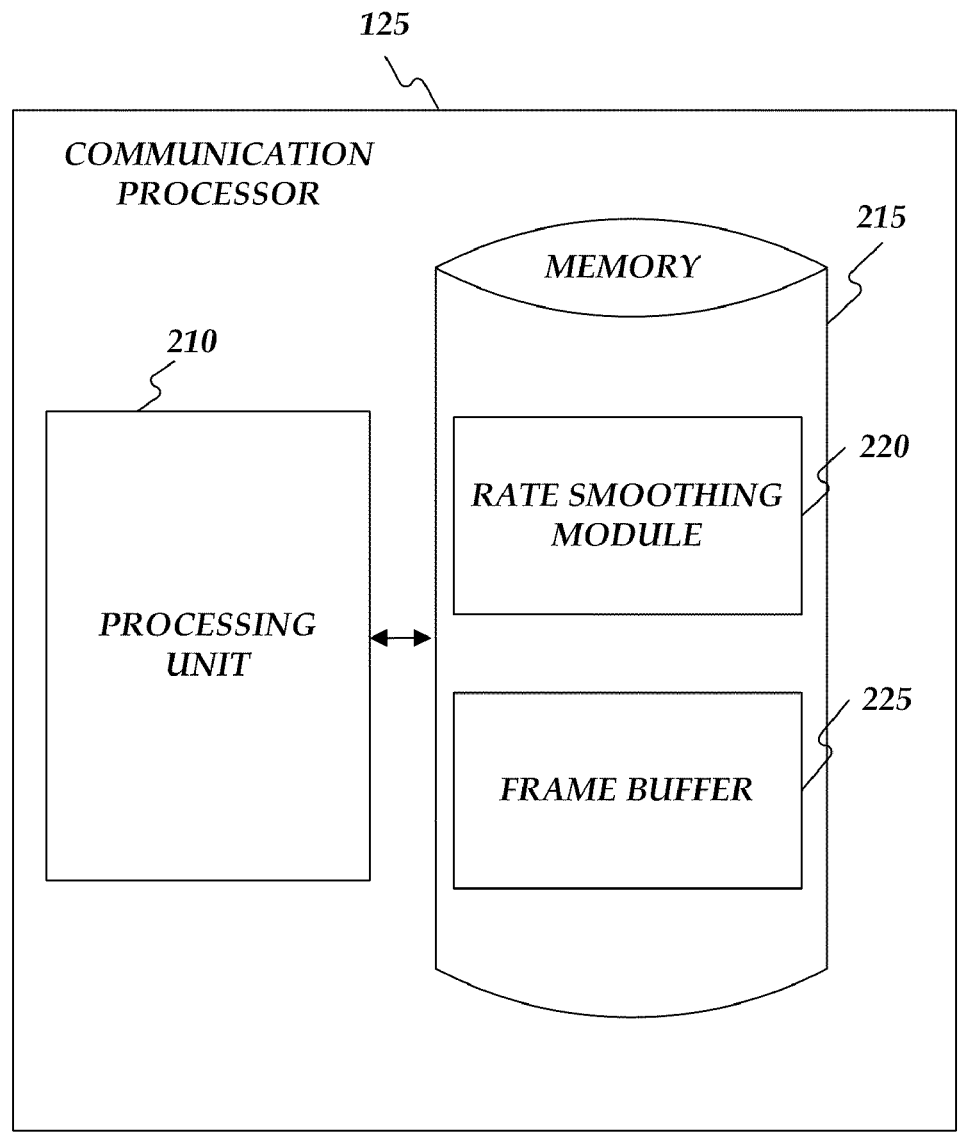
FIG. 2 is a block diagram of a communication processor.

FIG. 2 shows communications processor 125 of FIG. 1 in more detail. As shown in FIG. 2, communications processor 125 may include a processing unit 210 and a memory unit 215. Memory 215 may include a rate smoothing module 220 and a frame buffer 225. While executing on processing unit 210, rate smoothing module 220 may perform processes for providing rate smoothing in video transmission, including, for example, one or more stages included in method 400 described below with respect to FIG. 4. Furthermore, rate smoothing module 220 and frame buffer 225 may be executed on or reside in any element shown and/or described with respect to FIG. 1. Moreover, any one or more of the stages included in method 300 may be performed on any element shown in FIG. 1 including, but not limited to, VoD server 120, broadcast server 130, edge network 110, edge QAM 115, HFC network 145, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Encoding schemes such as MPEG-2 and MPEG-4 may compress video frame data for transmission over a network. Each picture element of a frame, or pixel, may be represented by one luma number and two chrominance numbers comprising the brightness and color of the pixel. These pixel representations, in HDTV, for example, may comprise a raw video stream of 149,299,200 bytes per second for 24 fps video. The actual transmission size may vary depending on a number of factors such as the frame rate, resolution, and compression scheme. Much of the data from frame to frame may be redundant, however, such as where a scene of a person talking changes little from frame to frame apart from the person's mouth movements.

Figure 3:
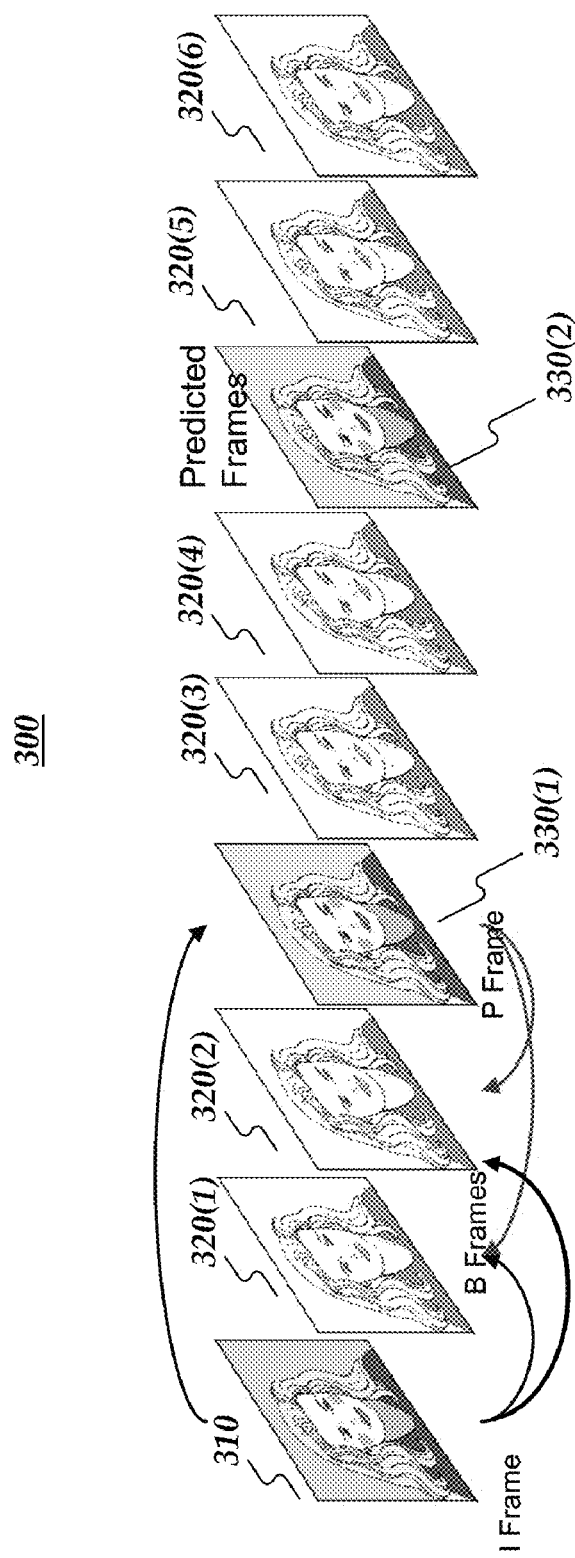
FIG. 3 is an example illustration of a Group of Pictures interval.

FIG. 3 is an example illustration of a Group of Pictures (GOP) interval 300 that may be used in the MPEG encoding schemes to compress the raw video stream. A GOP may comprise a number of frames of video, typically 8, 12, or 16 frames per group. GOP 300 may comprise a partial group for illustration purposes, and may comprise an intra-coded frame (I-frame) 310, a plurality of bidirectionally-predictive-coded frames (B-frames) 320(1)-320(6), and a plurality of predictive-coded frames (P-frames) 330(1)-330(2). I-frame 310 may comprise a compressed version of a single uncompressed (raw) frame. It may take advantage of spatial redundancy and of the inability of the eye to detect certain changes in the image from a previous frame. Unlike P-frames and B-frames, I-frames do not depend on data in the preceding or the following frames. However, because the compression algorithm may exclude pixel data that may be considered redundant from a previous frame, an I-frame may not include data for every pixel of the frame. Thus, the size of I-frames may vary over the course of a video stream. For example, an I-frame representing part of the same visual scene as the immediately previous frame may be much smaller in size than an I-frame representing an entirely new and different frame.

During compression, the raw frame may be divided into 8 pixel by 8 pixel blocks. In MPEG-2, for example, the data in each block may be transformed by a discrete cosine transform resulting on an 8 by 8 matrix of coefficients. The transform may convert spatial variations into frequency variations, but it does not change the information in the block; the original block may be recreated by applying the inverse cosine transform. The frame image may be simplified by quantizing the coefficients and compressing the matrix. Depending on the encoding scheme, every Nth frame is made into an I-frame. P-frames and B-frames might follow an I-frame like this, IBBPBBPBBPBB(I), to form a Group Of Pictures (GOP). The number of frames per interval is variable, and may change over the course of a video stream and/or vary according to a modulation scheme used to transmit the stream. A default GOP size for NTSC modulation may comprise 15, for example, while PAL modulation may comprise a GOP size of 12. A GOP may also end early in order to encode the first frame of a new scene as an I-frame.

P-frames may provide more compression than I-frames because they take advantage of the data in the previous I-frame or P-frame. I-frames and P-frames may be referred to as reference frames, and consistent with embodiments of the invention, B-frames may also be used as reference frames. To generate a P-frame, the previous reference frame is reconstructed. The frame being compressed may be divided into 16 pixel by 16 pixel macroblocks. Then, for each of those macroblocks, the reconstructed reference frame may be searched to find that 16 by 16 macroblock that best matches the macroblock being compressed. The offset may be encoded as a motion vector. The offset is zero, but, if something in the picture is moving, the offset might be something like 23 pixels to the right and 4 pixels up. If no suitable match is found, the macroblock may be treated like an I-frame macroblock and encoded as a whole. The processing of B-frames is similar to that of P-frames except that B-frames may use the picture in the following reference frame as well as the picture in the preceding reference frame. As a result, B-frames may provide more compression than P-frames.

Figure 4A:
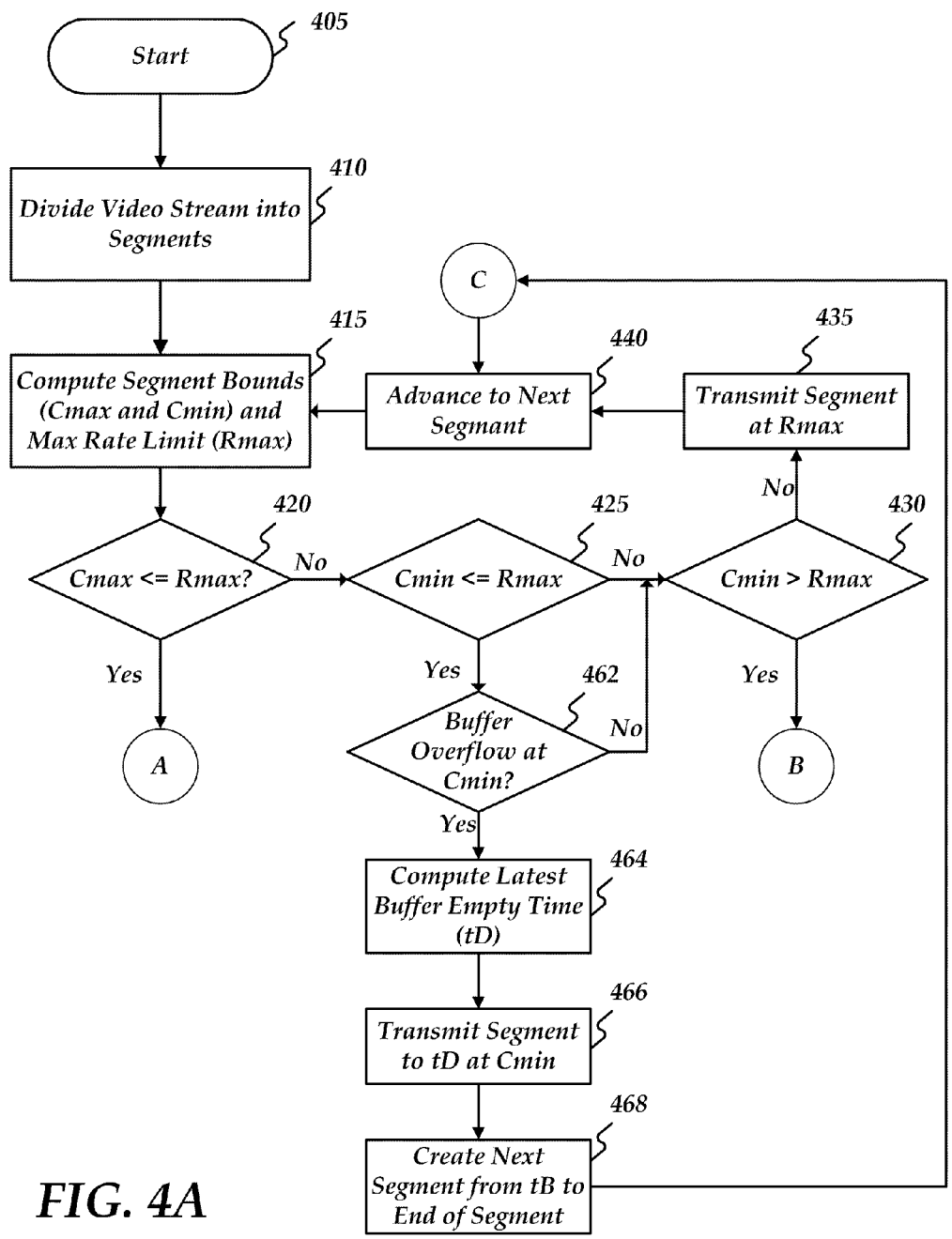
FIGS. 4A-4B are flow charts of a method for providing video traffic smoothing.
Figure 4B:
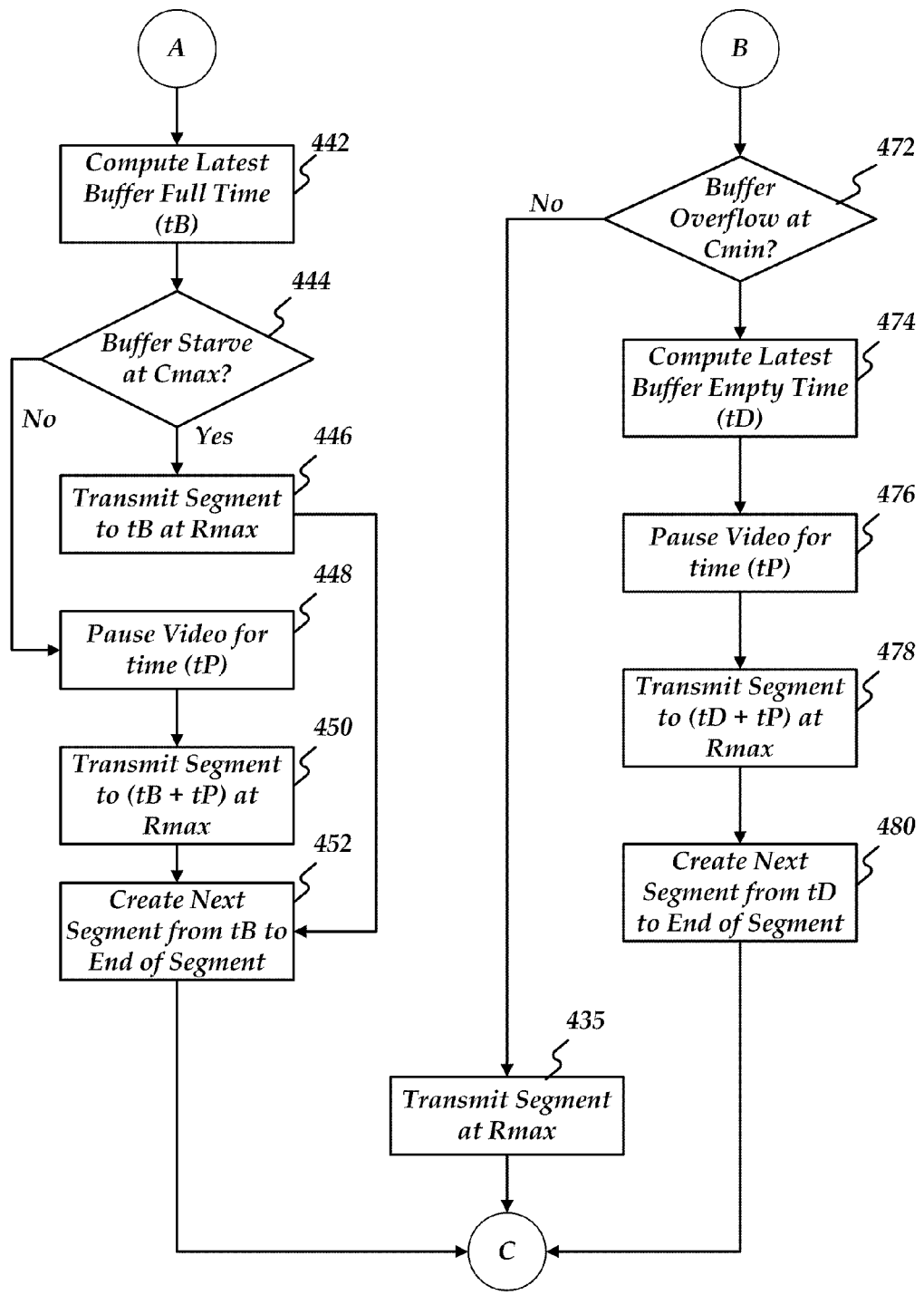

FIGS. 4A-4B are flow charts of a method 400 for providing video smoothing with rate control. Method 400 may by implemented using communication processor 125 as described above with respect to FIGS. 1 and 2. Ways to implement the stages of method 400 will be described in greater detail below. Method 400 may begin at starting block 405 and proceed to stage 410 where communication processor 125 may divide a video stream into a plurality of segments. For example, the video stream may comprise a video-on-demand program supplied by VoD Server 120. The size of each segment may be selected according to available bandwidth, an encoding type of the video stream, and/or a frame rate of the video stream. Consistent with embodiments of the invention, the amount of bandwidth needed to transmit a segment may increase as the segment size increases while the amount of processing overhead may increase as the number of segments into which the video stream is divided increases.

From stage 410, method 400 may advance to stage 415 where communication processor 125 may compute a maximum transmission rate ($R_{max}$) and a range of possible transmission rates bounded by an upper limit ($C_{max}$) and a lower limit ($C_{min}$). $R_{max}$ may comprise a desired and/or optimal transmission rate computed to make an efficient use of available network resources. A network cost (c) function as described in Equation 1 may be used to derive $R_{max}$.

$$c = R_{max}(L_{seg} + t_p) + B_p - B_b - B_c \quad \text{Equation 1}$$

In Equation 1, $L_{seg}$ may comprise a length of the segment in seconds, $t_p$ may comprise a total smoothing time, $B_p$ may comprise extra bits representing any pause time, $B_b$ may comprise bits not transmitted due to deletion of frames, and $B_c$ may comprise a size of a memory buffer associated with a receiving device. $t_p$ may comprise a total smoothing time comprising a length of additional pause time that may be added to the segment, such as to provide additional time for processing of the segment (e.g., time needed to execute the algorithm(s) of method 400) and/or other segments of the video stream. For example, a scene change in the video stream may require additional processing and/or transmission time due to a larger amount of data that may need to be transmitted. The pause time may be computed so that when added to the segment transmission time, the total time interval may prevent the starvation/overflow of the memory buffer associated with the receiving device, such as STB 150.

Deletion of frames resulting in $B_b$ deleted bits may occur due to algorithms used to reduce the amount of data needed to transmit the video stream while maintaining video quality. A predictive method for selecting frames for deleting is described in co-pending related application having Ser. No. 12/550,698, entitled "Video Traffic Bandwidth Prediction," and assigned to the assignee of the current application, hereby incorporated by reference in its entirety.

In an example consistent with embodiments of the invention, a memory buffer associated with STB 150 may comprise a size of 1 MB. For this example, Table 1, below, comprises data showing how a coefficient of variability (CoV) increases as $R_{max}$ increases while pause time ($t_p$) and a memory buffer utilization both decrease. The CoV may comprise a metric for measuring the bit rate variability throughout the encoded video; as the bit rate varies more, the CoV increases. Based on this example, the network cost may be minimized at an $R_{max}$ value of 0.9 Mbps.

TABLE 1

| $R_{max}$ (Mbps) | CoV | $t_p$ (s) | Buffer Utilization (%) |
|---|---|---|---|
| 0.75 | 0.030634 | 139.83 | 99.63 |
| 0.9 | 0.071577 | 81.13 | 94.81 |
| 1.05 | 0.140538 | 50.06 | 87.85 |
| 1.2 | 0.205606 | 26.76 | 81.83 |
| 1.35 | 0.2646 | 8.7 | 76.58 |
| 1.5 | 0.2939 | 0.9 | 70.54 |
| 1.65 | 0.2992 | 0 | 64.31 |

$C_{max}$ may be defined as a maximum rate at which communication processor 125 may transmit over a given segment t without overflowing the memory buffer of the receiving device. $C_{max}$ may represent a slope between values defined as the maximum cumulative data that can be received by the receiving device over the segment ($B_t$) and the minimum cumulative data that must be sent over the segment to avoid interruption of the playback of the video stream ($D_t$) where the memory buffer of the receiving device is full.

$C_{min}$ may be defined as a minimum rate at which the server may transmit over a given segment t such that the memory buffer of the receiving device never starves (e.g., such that the playback of the video stream will not be halted for lack of data in the memory buffer). $C_{min}$ may represent a slope between the values of $B_t$ and $D_t$ where the memory buffer of the receiving device is empty.

For Equations 2 and 3, below, a usage level of the memory buffer at the start of the segment (time a) may be represented by q while an initial time of segment t may be represented by a.

$$C_{max}(t) = \frac{B(t) - [D(a) + q]}{t - a} \quad \text{Equation 2}$$

$$C_{min}(t) = \frac{D(t) - [D(a) + q]}{t - a} \quad \text{Equation 3}$$

After establishing the maximum transmission rate ($R_{max}$) and the upper and lower bounds ($C_{max}$ and $C_{min}$, respectively) of the possible transmission rate range, method 400 may advance to stage 420 where communication processor 125 may determine whether $R_{max}$ exceeds the maximum possible transmission rate, $C_{max}$. For example, $R_{max}$ may comprise a transmission rate of 4.5 Mbps while $C_{max}$ may represent a maximum available bandwidth of 6 Mbps.

If, at stage 420, communication processor 125 determines that $R_{max}$ does not exceed $C_{max}$, method 400 may advance to stage 425 where communication processor 125 may determine whether $R_{max}$ is greater than the lower bound of the transmission rate range, $C_{min}$. For example, STB 150 may require a minimum transmission rate of 256 Kbps to avoid buffer starvation, while $R_{max}$ may comprise 4.5 Mbps.

If, at stage 425, communication processor 125 determines that $R_{max}$ is at least equal to $C_{min}$, method 400 may advance to stage 430 where computing device 400 may determine whether $R_{max}$ meets the minimum required transmission rate of $C_{min}$. For example, if $R_{max}$ comprises 512 Kbps, and $C_{min}$ comprises 256 Kbps, the minimum required rate may be met.

If, at stage 430, communication processor 125 determines that $C_{min}$ is not greater than $R_{max}$, method 400 may advance to stage 435 where the segment (t) may be transmitted at the maximum and/or desired transmission rate of $R_{max}$. Method 400 may then advance to stage 440 where communication processor 125 may advance to the next segment and return to stage 415. If there are no further segments in the video stream to be transmitted, method 400 may end.

If, at stage 420, communication processor 125 determines that $C_{max}$ is less than or equal to $R_{max}$, method 400 may advance to stage 442 where communication processor 125 may compute a latest time within segment t where the memory buffer of the receiving device may be full when transmitting at a rate equal to $C_{max}$, referred to as $t_B$.

From stage 442, method 400 may advance to stage 444 where communication processor 125 may determine whether transmitting the segment at a rate equal to $C_{max}$ may result in buffer starvation during the segment. If so, method 400 may advance to stage 446 where communication processor 125 may transmit the frames from the first frame of segment t through the frame associated with time $t_B$ at rate $R_{max}$. Method 400 may then advance to stage 452, where communication processor 125 may create a new segment from the remaining frames of segment t. That is, the new segment may be comprised of frames from the frame immediately subsequent to the frame associated with time $t_B$ through the last frame of the original segment t. This new frame may be treated as the next segment to be smoothed and transmitted as method 400 returns to stage 440.

Otherwise, if communication processor 125 determines that the memory buffer may not starve if the segment is transmitted at $C_{max}$, method 400 may advance to stage 448 where communication processor 125 may pause the video for a time $t_p$. As stated above, $t_p$ may be computed so that when added to the segment transmission time, the total time interval may prevent the starvation of the memory buffer associated with the receiving device, such as STB 150.

From stage 448, method 400 may advance to stage 450 where communication processor 125 may transmit a portion of the segment t. This portion may comprise the first frame of segment t through a frame associated with time ($t_B+t_p$). For example, the segment may comprise 3 seconds of the video stream, or 90 frames of a 30 fps video stream. If $t_B$ is computed as 1.5 seconds (i.e., 45 frames) and $t_p$ is computed as 0.5 seconds (i.e., 15 frames), communication processor 125 may transmit the first 60 frames of segment t at rate $R_{max}$. Method 400 may then advance to stage 452 where communication processor may create a new segment from the remaining frames of segment t. That is, the new segment may be comprised of frames from the frame immediately subsequent to the frame associated with time $t_B$ through the last frame of the original segment t. This new frame may be treated as the next segment to be smoothed and transmitted as method 400 returns to stage 440. This may provide an overlap of segments.

If, at stage 425, communication processor 125 determines that $C_{min}$ is less than or equal to $R_{max}$, method 400 may advance to stage 462 where communication processor 125 may determine whether transmitting segment t at rate $C_{min}$ may result in an overflow of the memory buffer of the receiving device. For example, communication processor 125 may determine if transmitting the data associated with segment t at the minimum possible rate may still result in sending frames faster than the receiving device can render them and requiring more storage space to buffer than is available to the receiving device. If not, method 400 may advance to stage 430 as described above.

If, however, transmitting at $C_{min}$ may result in a buffer overflow during segment t, method 400 may advance to stage 464 where communication processor 125 may compute a latest time, $t_D$, at which the memory buffer of the receiving device may be empty when transmitting at a rate equal to $C_{min}$. Method 400 may then advance to stage 466 where communication processor 125 may transmit the frames from the first frame of segment t through the frame associated with time $t_D$ at rate $C_{min}$. Method 400 may then advance to stage 468, where communication processor 125 may create a new segment from the remaining frames of segment t. That is, the new segment may be comprised of frames from the frame immediately subsequent to the frame associated with time $t_D$ through the last frame of the original segment t. This new frame may be treated as the next segment to be smoothed and transmitted as method 400 returns to stage 440.

If, at stage 430, communication processor 125 determines that $C_{min}$ is greater than $R_{max}$, method 400 may advance to stage 472 where communication processor 125 may determine whether transmitting segment t at $C_{min}$ may cause a buffer overflow at the receiving device. If not, method 400 may return to stage 435 and transmit the segment at rate $R_{max}$. Otherwise, method 400 may advance to stage 474 where communication processor may compute a latest time, $t_D$, at which the memory buffer of the receiving device may be empty when transmitting at a rate equal to $C_{min}$.

Method 400 may then advance to stage 476 where communication processor 125 may pause the video for a time $t_p$. As stated above, $t_p$ may be computed so that when added to the segment transmission time, the total time interval may prevent the overflow of the memory buffer associated with the receiving device, such as STB 150.

From stage 476, method 400 may advance to stage 478 where communication processor 125 may transmit a portion of the segment t. This portion may comprise the first frame of segment t through a frame associated with time ($t_D+t_p$). Method 400 may then advance to stage 480 where communication processor may create a new segment from the remaining frames of segment t. That is, the new segment may be comprised of frames from the frame immediately subsequent to the frame associated with time $t_D$ through the last frame of the original segment t. This new frame may be treated as the next segment to be smoothed and transmitted as method 400 returns to stage 440.

Figure 5A:
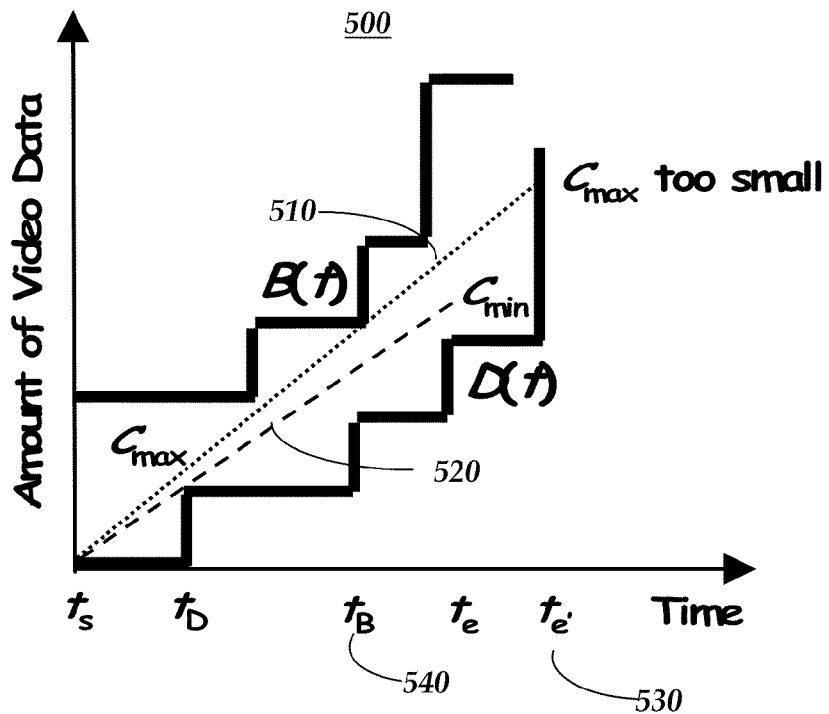
FIGS. 5A-5B are plots illustrating variable effects on rate smoothing.

FIG. 5A comprises a plot 500 illustrating a $C_{max}$ slope 510 and a $C_{min}$ slope 520 where the $C_{max}$ upper bound may be too small and thus result in buffer starvation at a time $t_e$, 530 comprising an end of a segment. Consistent with embodiments of the invention, the segment may be ended at an earlier time $t_B$ 540 and a new segment may be created comprising the frames from $t_B$ to $t_{e'}$.

Figure 5B:
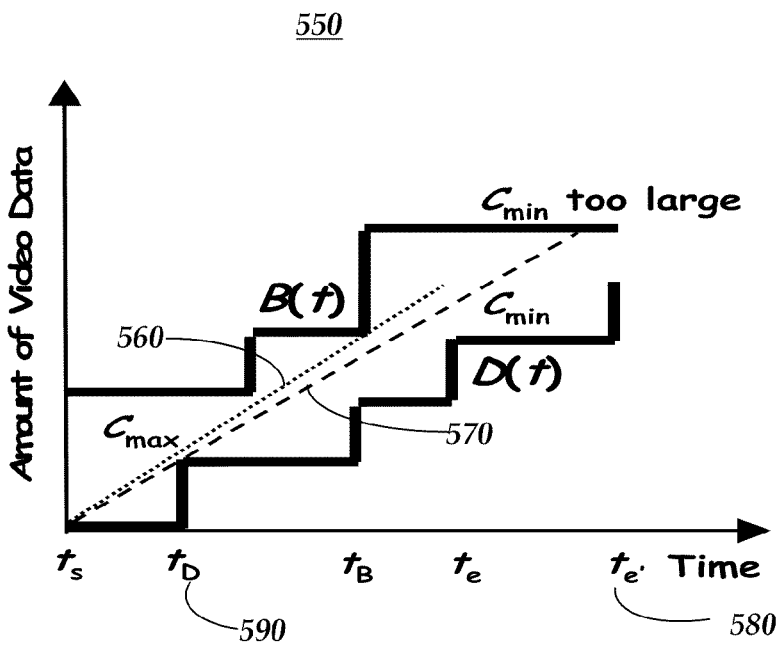

FIG. 5B comprises a plot 550 illustrating a $C_{max}$ slope 560 and a $C_{min}$ slope 570 where the $C_{min}$ lower bound may be too large and thus result in a buffer overflow at a time $t_{e'}$ 580. Consistent with embodiments of the invention, the segment may be ended at an earlier time $t_D$ 590 and a new segment may be created comprising the frames from $t_D$ to $t_{e'}$.

Figure 6:
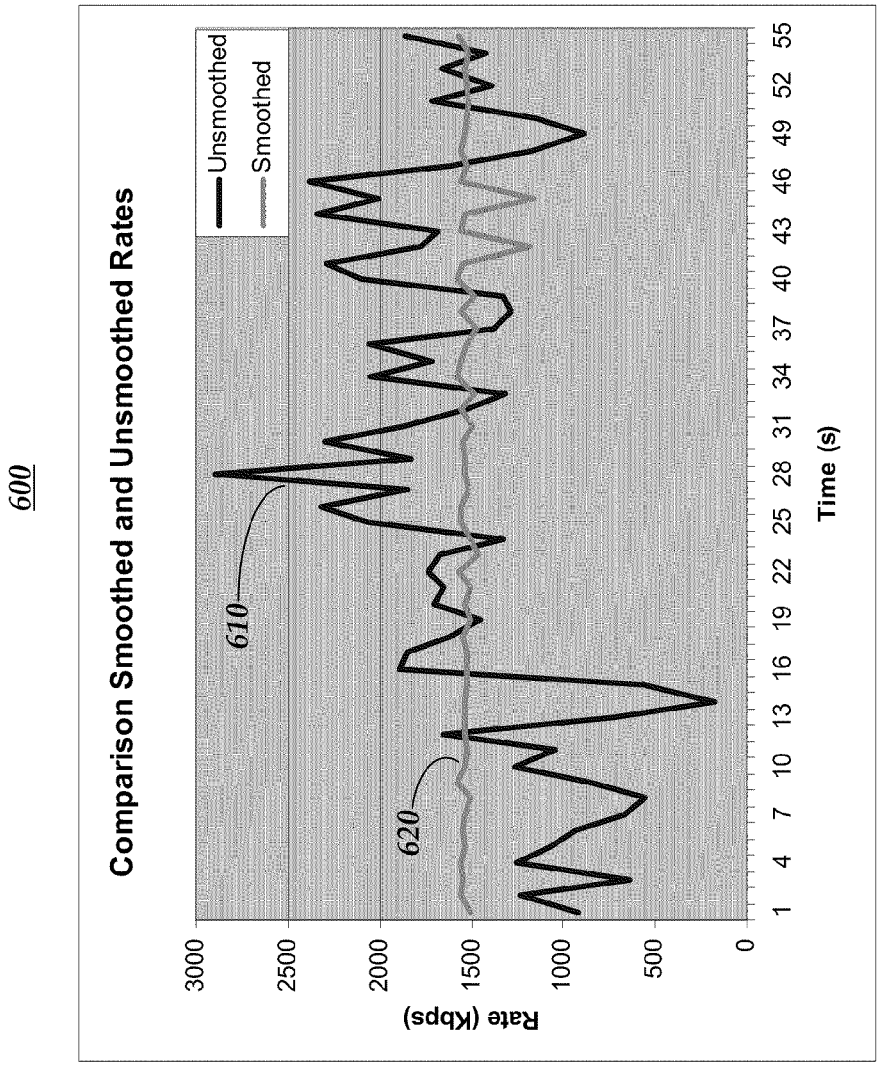
FIG. 6 is a plot illustrating a comparison of smoothed and unsmoothed transmission rates.

FIG. 6 comprises a plot 600 illustrating transmission rates over time. As can be seen from plot 600, an unsmoothed video stream 610 illustrates a high CoV while a smoothed video stream 620, comprising the same source video stream modified according to embodiments consistent with the invention, illustrates a much lower CoV.

An embodiment consistent with the invention may comprise a system for providing video traffic smoothing. The system may comprise a memory storage and a processing unit coupled to the memory storage. The processing unit may be operative to establish a transmission rate range for transmission of a video stream comprising an upper bound and a lower bound, divide the video stream into a plurality of segments, select a maximum rate limit for a segment, determine whether the maximum rate limit falls within the upper and lower bounds, and, if so, transmit the segment at the maximum rate limit.

Another embodiment consistent with the invention may comprise a system for providing video traffic smoothing. The system may comprise a communication processor comprising a memory storage coupled to a processing unit, wherein the processing unit is operative to divide an encoded video stream into a plurality of segments, compute a transmission rate for transmitting at least one segment to a receiver, and transmit the segment to the receiver at the computed transmission rate.

Yet another embodiment consistent with the invention may comprise a system for providing video traffic smoothing. The system may comprise a memory storage and a processing unit coupled to the memory storage. The processing unit may be operative to receive an encoded video stream, divide the video stream into a plurality of segments, select a maximum transmission rate for at least one segment, establish a range of possible transmission rates for the at least one segment, determine whether the maximum transmission rate comprises a rate at which the at least one segment can be transmitted to a receiving device without causing either starvation or an overflow of a memory buffer associated with the receiving device, and, if so, transmit the segment at the transmission rate.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing video traffic smoothing, the method comprising:

establishing a transmission rate range for transmission of a video stream comprising an upper bound and a lower bound;

dividing the video stream into a plurality of segments, wherein each segment comprises a plurality of frames of the video stream;

selecting a maximum rate limit for a first segment of the plurality of segments;

determining whether the maximum rate limit exceeds the upper bound of the transmission rate range;

in response to determining that the maximum rate limit does not exceed the upper bound of the transmission rate range, determining whether the lower bound of the transmission rate range exceeds the maximum rate limit;

in response to determining that the lower bound of the transmission rate range exceeds the maximum rate limit, determining whether transmitting the first segment at the lower bound of the transmission rate range will cause an overflow of a memory buffer associated with a receiver before all of the plurality of frames associated with the first segment have been transmitted; and in response to determining that transmitting the first segment at the lower bound of the transmission rate range will cause the overflow of the memory buffer associated with the receiver before all of the plurality of frames associated with the first segment have been transmitted:
pausing playback of the video stream for a pause time,
determining a latest time within the first segment at which the memory buffer associated with the receiver will be empty, and
transmitting any of the plurality of frames of the first segment from a first frame of the segment to a frame associated with a time computed as the pause time plus the determined latest time within the first segment at which the memory buffer associated with the receiver will be empty at the maximum rate limit.

2. The method of claim 1, wherein the upper bound comprises a maximum rate at which data can be transmitted to a receiving device without overflowing a memory buffer associated with the receiving device.

3. The method of claim 2, wherein the upper bound comprises a rate configured to utilize all bandwidth assigned to transmit the video stream.

4. The method of claim 1, wherein the lower bound comprises a minimum rate at which data must be transmitted to a receiving device without starving a memory buffer associated with the receiving device.

5. The method of claim 4, wherein the lower bound is established according to at least one of the following: an encoding scheme associated with the video stream, an average frame size of a plurality of frames associated with the video stream, and a frame rate of the plurality of frames associated with the video stream.

6. The method of claim 1, wherein selecting the maximum rate limit comprises selecting a maximum transmission rate such that a network cost is minimized.

7. The method of claim 1, further comprising:
determining whether the maximum rate limit exceeds the upper bound of the transmission rate range;
in response to determining that the maximum rate limit exceeds the upper bound of the transmission rate range, determining whether transmitting at the upper bound of the transmission rate range will cause starvation of the memory buffer associated with the receiver of the transmitted video stream;
in response to determining that transmitting at the upper bound of the transmission rate range will cause starvation of the memory buffer associated with the receiver of the transmitted video stream, determining a time within the first segment at which the memory buffer associated with the receiver is full; and
transmitting any of the plurality of frames of the first segment from a first frame of the first segment to a frame associated with the determined time within the first segment at which the memory buffer associated with the receiver is full at the maximum rate limit.

8. The method of claim 7, further comprising:
ending the first segment at the determined time within the first segment at which the memory buffer associated with the receiver is full; and
creating a second segment of the video stream from the time within the first segment at which the memory buffer associated with the receiver is full to a last frame of the first segment.

9. The method of claim 7, further comprising:
in response to determining that transmitting at the upper bound of the transmission rate range will not cause starvation of the memory buffer associated with the receiver of the transmitted video stream:
pausing playback of the video stream for a pause time,
determining a time within the first segment at which the memory buffer associated with the receiver is full, and
transmitting any of the plurality of frames of the first segment from a first frame of the segment to a frame associated with a time computed as the pause time plus the determined time within the first segment at which the memory buffer associated with the receiver is full at the maximum rate limit.

10. The method of claim 1, further comprising:
in response to determining that the maximum rate limit does exceed the upper bound of the transmission rate range, determining whether transmitting the first segment at the lower bound of the transmission rate range will cause the overflow of the memory buffer associated with a receiver before all of the plurality of frames associated with the first segment have been transmitted;
in response to determining that transmitting the first segment at the lower bound of the transmission rate range will cause the overflow of the memory buffer associated with the receiver before all of the plurality of frames associated with the first segment have been transmitted:
determining the latest time of the first segment at which the memory buffer associated with the receiver device will be empty when transmitting the segment at the minimum transmission rate,
transmitting, to the receiver, all of the plurality of frames of the first segment from a first frame of the first segment to a frame associated with the determined latest time of the first segment at the lower bound of the transmission rate range.

11. The method of claim 10, further comprising:
ending the first segment at the determined latest time within the first segment at which the memory buffer associated with the receiver will be empty; and
creating a second segment of the video stream from the time within the first segment at which the memory buffer associated with the receiver will be empty to a last frame of the first segment.

12. A system for providing video traffic smoothing, the system comprising:
   a communication processor comprising a memory storage coupled to a processing unit, wherein the processing unit is operative to:
      divide an encoded video stream into a plurality of segments;
      for at least one of the plurality of segments, compute a transmission rate for transmitting the at least one segment to a receiver comprising a memory buffer;
      pause playback of the video stream for a pause time when it is determined that the transmission rate for the at least one of segment will not result in a starvation of the memory buffer associated with the receiver;
      determine, when a maximum rate limit is greater than or equal to an upper bound of a bounded range of transmission rates, a time within the at least one segment at which the memory buffer associated with the receiver is full; and
      transmit any of a plurality of frames of the at least one segment from a first frame of the first segment to a frame associated with a time computed as the pause time plus the determined time within the first segment at which the memory buffer associated with the receiver is full at the maximum rate limit.

13. The system of claim 12, wherein the processing unit is further operative to:
   determine whether the transmission rate for the at least one segment will result in an overflow of the memory buffer associated with the receiver; and
   in response to determining that the transmission rate for the at least one segment will result in the overflow of the memory buffer associated with the receiver, being further operative to reduce the transmission rate.

14. The system of claim 13, wherein being operative to reduce the transmission rate comprises being operative to reduce the transmission rate to a rate within a bounded range of transmission rates.

15. The system of claim 12, wherein the processing unit is further operative to:
   determine whether the transmission rate for the at least one segment will result in a starvation of the memory buffer associated with the receiver; and
   in response to determining that the transmission rate for the at least one segment will result in the starvation of the memory buffer associated with the receiver, being further operative to increase the transmission rate.

16. The system of claim 15, wherein being operative to increase the transmission rate comprises being operative to increase the transmission rate to a rate within a bounded range of transmission rates.

17. A computer-readable non-transitory medium which stores a set of instructions which when executed performs a method for providing video traffic smoothing, the method executed by the set of instructions comprising:
   receiving an encoded video stream;
   dividing the video stream into a plurality of segments, wherein each segment comprises a plurality of video frames;
   selecting a maximum transmission rate for at least one segment of the plurality of segments;
   establishing a range of possible transmission rates for the at least one segment comprising an upper bound and a lower bound;
   in response to determining that transmitting at the upper bound of the transmission rate range will not cause starvation of a memory buffer associated with a receiver of the video stream:
      pausing playback of the video stream for a pause time,
      determining, when the maximum rate limit is greater than or equal to the upper bound, a time within the first segment at which the memory buffer associated with the receiver is full, and
      transmitting any of the plurality of frames of the first segment from a first frame of the segment to a frame associated with a time computed as the pause time plus the determined time within the first segment at which the memory buffer associated with the receiver is full at the maximum rate limit.

18. The computer-readable non-transitory medium of claim 17, further comprising:
   in response to determining that the maximum transmission rate does not comprise a rate at which the at least one segment can be transmitted to the receiving device without causing starvation of the memory buffer associated with the receiving device, identifying a latest time of the at least one segment at which the memory buffer associated with the receiving device will be empty when transmitting the segment at the maximum transmission rate;
   transmitting a subset of the plurality of video frames of the at least one segment to the receiving device at the maximum transmission rate, wherein the subset of the plurality of video frames of the at least one segment comprises a first frame associated with the at least one segment through a frame of the at least one segment associated with the identified latest time of the at least one segment at which the memory buffer associated with the receiving device will be empty; and
   creating a new segment from a remainder of the plurality of video frames of the at least one segment.

19. The computer-readable non-transitory medium of claim 17, further comprising:
   in response to determining that the maximum transmission rate does not comprise a rate at which the at least one segment can be transmitted to the receiving device without causing the overflow of the memory buffer associated with the receiving device, identifying a latest time of the at least one segment at which the memory buffer associated with the receiving device will be full when transmitting the segment at the maximum transmission rate;
   transmitting a subset of the plurality of video frames of the at least one segment to the receiving device at the maximum transmission rate, wherein the subset of the plurality of video frames of the at least one segment comprises a first frame associated with the at least one segment through a frame of the at least one segment associated with the identified latest time of the at least one segment at which the memory buffer associated with the receiving device will be full; and
   creating a new segment from a remainder of the plurality of video frames of the at least one segment.

20. The method of claim 1, further comprising:
   in response to determining that the lower bound of the transmission rate range exceeds the maximum rate limit, determining whether transmitting the first segment at the lower bound of the transmission rate range will cause an overflow of a memory buffer associated with a receiver before all of the plurality of frames associated with the first segment have been transmitted; and in response to determining that transmitting the first segment at the lower bound of the transmission rate range will cause the overflow of the memory buffer associated with the receiver before all of the plurality of frames associated with the first segment have been transmitted:
- pausing playback of the video stream for a pause time,
- determining a latest time within the first segment at which the memory buffer associated with the receiver will be empty, and
- transmitting any of the plurality of frames of the first segment from a first frame of the segment to a frame associated with a time computed as the pause time plus the determined latest time within the first segment at which the memory buffer associated with the receiver will be empty at the maximum rate limit.

21. The computer-readable non-transitory medium of claim 17, further comprising:

determining whether the maximum transmission rate comprises a rate at which the at least one segment can be transmitted to a receiving device without causing starvation of a memory buffer associated with the receiving device;

in response to determining that the maximum transmission rate comprises a rate at which the at least one segment can be transmitted to the receiving device without causing starvation of the memory buffer associated with the receiving device, determining whether the maximum transmission rate comprises a rate at which the at least one segment can be transmitted to the receiving device without causing an overflow of the memory buffer associated with the receiving device; and in response to determining that the maximum transmission rate comprises a rate at which the at least one segment can be transmitted to the receiving device without causing the overflow of the memory buffer associated with the receiving device, transmitting the at least one segment to the receiving device at the maximum transmission rate.

* * * * *

UNITED STATES PATENT AND TRADEMARK OFFICE
CERTIFICATE OF CORRECTION

| | |
|---|---|
| PATENT NO. | : 8,400,918 B2 |
| APPLICATION NO. | : 12/581014 |
| DATED | : March 19, 2013 |
| INVENTOR(S) | : Benny Bing |

It is certified that error appears in the above-identified patent and that said Letters Patent is hereby corrected as shown below:

In the Specification

IN THE RELATED APPLICATIONS paragraph, column 1, line 13, "on even date herewith" should read --October 16, 2009--.

Signed and Sealed this
Second Day of June, 2015

Michelle K. Lee
*Director of the United States Patent and Trademark Office*